United States Patent
Farace et al.

(10) Patent No.: US 10,472,236 B2
(45) Date of Patent: Nov. 12, 2019

(54) CATALYST TUBE FOR REFORMING

(71) Applicant: TECHNIP FRANCE, Courbevoie (FR)

(72) Inventors: Antonio Farace, Delft (NL); Stephane Walspurger, Amstelveen (NL)

(73) Assignee: TECHNIP FRANCE, Courbevoie (FR)

( * ) Notice: Subject to any disclaimer, the term of this patent is extended or adjusted under 35 U.S.C. 154(b) by 0 days.

(21) Appl. No.: 16/344,776

(22) PCT Filed: Oct. 25, 2017

(86) PCT No.: PCT/EP2017/077345
§ 371 (c)(1),
(2) Date: Apr. 24, 2019

(87) PCT Pub. No.: WO2018/077969
PCT Pub. Date: May 3, 2018

(65) Prior Publication Data
US 2019/0233284 A1 Aug. 1, 2019

(30) Foreign Application Priority Data

Oct. 25, 2016 (EP) ..................................... 16195490

(51) Int. Cl.
| | |
|---|---|
| *B01J 8/02* | (2006.01) |
| *C01B 3/38* | (2006.01) |
| *B01J 8/06* | (2006.01) |

(52) U.S. Cl.
CPC .............. *C01B 3/384* (2013.01); *B01J 8/0257* (2013.01); *B01J 8/062* (2013.01);
(Continued)

(58) Field of Classification Search
CPC ......... C01B 3/384; B01J 8/0257; B01J 8/062; B01J 2208/0053; B01J 2208/065;
(Continued)

(56) References Cited

U.S. PATENT DOCUMENTS

| | | | | |
|---|---|---|---|---|
| 5,000,926 A | * | 3/1991 | Murayama | ............... B01J 8/067 422/148 |
| 6,255,357 B1 | * | 7/2001 | Abbott | .................... C01B 3/382 518/700 |

(Continued)

FOREIGN PATENT DOCUMENTS

| | | |
|---|---|---|
| EP | 2223739 A1 | 9/2010 |
| EP | 2708812 A1 | 3/2014 |

(Continued)

OTHER PUBLICATIONS

PCT International Search Report and Written Opinion dated Dec. 15, 2017, issued in corresponding PCT International Application No. PCT/EP2017/077345.

*Primary Examiner* — Huy Tram Nguyen
(74) *Attorney, Agent, or Firm* — Locke Lord LLP; Alan B. Clement

(57) ABSTRACT

The inventions is directed to a new design for catalyst tubes, which makes it possible to apply the concept of regenerative reforming into steam reformers having catalyst tube inlets and outlets at opposite sides of the furnace chamber. The catalyst tube comprises an inlet for process gas to enter the catalyst tube and an outlet for process gas to exit the catalyst tube, which inlet and outlet are located at opposite ends of the catalyst tube. The catalyst tube further comprises a first annular channel comprising the catalyst, a second annular channel for process gas to flow countercurrently or co-currently to the process gas flowing through the first annular channel.

21 Claims, 3 Drawing Sheets

(52) U.S. Cl.
CPC ............................ *B01J 2208/0053* (2013.01);
*B01J 2208/0092* (2013.01); *B01J 2208/00176*
(2013.01); *B01J 2208/00194* (2013.01); *B01J
2208/00221* (2013.01); *B01J 2208/00539*
(2013.01); *B01J 2208/00557* (2013.01); *B01J
2208/00752* (2013.01); *B01J 2208/00761*
(2013.01); *B01J 2208/065* (2013.01); *B01J
2219/00024* (2013.01)

(58) Field of Classification Search
CPC ...... B01J 2208/0092; B01J 2208/00761; B01J
2208/00752; B01J 2208/00557; B01J
2219/00024; B01J 2208/00221; B01J
2208/00194; B01J 2208/00176; B01J
2208/00539
USPC ........................................................ 422/629
See application file for complete search history.

(56) References Cited

U.S. PATENT DOCUMENTS

| 6,620,388 | B1 | 9/2003 | Giacobbe et al. |
| 2001/0029735 | A1* | 10/2001 | Miura ..................... B01B 1/005 |
| | | | 60/512 |
| 2010/0254891 | A1* | 10/2010 | Giroudiere ............... B01J 8/062 |
| | | | 423/648.1 |
| 2014/0196875 | A1 | 7/2014 | Jensen et al. |

FOREIGN PATENT DOCUMENTS

| FR | 2918904 A1 | 1/2009 |
| WO | 95/011745 A1 | 5/1995 |
| WO | 20027518 A1 | 5/2000 |
| WO | 2001/12310 A1 | 2/2001 |
| WO | 2011/088982 A1 | 7/2011 |
| WO | 2014/040815 A1 | 3/2014 |

\* cited by examiner

CATALYST TUBE FOR REFORMING

CROSS-REFERENCE TO RELATED APPLICATIONS

This Application is a U.S. National Stage application under 35 U.S.C. 371 of International Application No. PCT/EP2017/077345 filed on Oct. 25, 2017, which claims the benefit of priority to European Patent Application No. EP 16195490.4 filed on Oct. 25, 2016 in the European Patent Office. The entire contents of these applications are incorporated herein by reference in their entirety.

BACKGROUND OF THE INVENTION

1. Field of the Invention

The invention is directed to a catalyst tube, a multitubular reactor, such as a steam reformer, comprising at least one of said catalyst tubes and a method for conducting a catalytic process such as steam reforming.

2. Description of Related Art

It is known to conduct catalytic processes in multitubular reactors. A well known example is the catalytic process of steam reforming.

Steam reforming is a catalytic process, wherein a hydrocarbon feedstock (feed gas) is converted into a mixture of carbon monoxide and hydrogen gas (called a process gas) in the presence of a metal-based catalyst, typically nickel. The conversion reaction is strongly endothermic and needs to be conducted at high temperatures, typically at least 700° C.

Catalytic conversion of process gas may be conducted in a multitubular reactor of an industrial furnace or fired heater. For example, steam reforming is conducted in a steam reformer. A fired heater or industrial furnace (such as a steam reformer) essentially has two main sections: the furnace (radiant section) and the heat recovery system (convection section). The radiant section comprises a furnace chamber with burners, which may be placed on the ceiling (a top fired furnace), the floor (bottom fired furnace) and/or the side surface (side fired furnace) of the furnace chamber. The burners produce then necessary heat by combustion of fuel. The radiant section further comprises multiple tubes, wherein the catalyst is loaded, to enable sufficient heat supply to the catalyst for the endothermic catalytic reaction to occur. The tubes in the radiant section wherein the conversion reaction takes place are called catalyst tubes. Multiple catalyst tubes are typically inserted into the radiant section. The convection section contains a number of heat exchangers for recovering heat. The hot flue gas leaving the radiant section passes through these heat exchangers, which are typically used for preheating of feedstock, water heating and steam production.

The outlet of the catalyst loaded tubes is the zone where the process gas reaches its highest temperature in the entire catalytic conversion process, typically over 880° C., up to 950-980° C. Accordingly, the process gas exiting the catalyst section of the catalyst tubes can be considered as a valuable high energy heat source.

Traditionally in steam reformers, the process gas leaving the catalyst tubes is routed via headers and transfer lines to a boiler wherein the process gas is cooled from over 880° C. (typically 880-950° C.) to a temperature of lower than 350° C., thereby producing high quality steam. This steam can then be used as process steam for the steam reforming reaction, export steam for surrounding production unit, or even power production. However, a disadvantage of producing steam in this way is that is not the most energy efficient way of recycling heat from the high temperature process gas.

The process gas exiting the catalyst tubes may also be used as a source of heat for the reforming reaction). This process may also be referred to as regenerative catalytic conversion since it uses part of the high value heat the process gas contains when leaving the catalytic zone to provide part of the reaction heat. In regenerative catalytic conversion, heat exchange takes place between the hot process gas exiting the catalytic zone of the catalyst tubes and the process gas being converted in the upstream part of the catalytic zone. This strategy can be used advantageously to decrease the external heat supply (through the combustion of fuel and waste gas in the fire box), to increase the fire box efficiency and to reduce the cost of heat exchange equipment needed for the heat recovery at the outlet of the reformer and in the convection section. An example of the process of regenerative catalytic conversion in reforming is for example known from WO 2011/088982. In this case, the process is referred to as regenerative reforming.

Two general types of steam reformers can be distinguished with respect to the way the catalyst tube inlets and outlets are oriented in the furnace chamber.

In steam reformers of the first type (type 1), both the process gas inlets and process gas outlets of the catalyst tubes are located at the same side of the furnace. Each catalyst tube is inserted into the furnace chamber, such that it extends through only one furnace wall. The gas will enter the furnace chamber through the one furnace chamber wall, flow through the furnace chamber, and then return to the same furnace wall and exit the furnace chamber again. Generally, the catalyst tubes are designed such that the process gas flows in a U-shaped path through the furnace chamber. An example of this type of steam reformer is for example given in EP 2 223 739 A1.

In steam reformers of the second type (type 2), the catalyst tube inlets are located at one end of the furnace chamber, while the catalyst tube outlets are located at the other opposite end of the furnace chamber. In type 2 reformers, the catalyst tubes are inserted into the furnace chamber in such a way that they extend through two opposite furnace walls. Generally, the catalyst tubes are designed as straight elongated tubes, such that the gas flows through the furnace chamber from one end to the other in a relatively straight path. An example of this type of steam reformer is for example given in WO 2014/040815.

The difference in catalyst tube design described above is a direct result of the difference in general design of the two types of steam reformers. As such, it is not possible to revamp a steam reformer of one type to fit the catalyst tubes designed for the other type. Similarly, catalyst tubes designed for steam reformers of the one type cannot be used or revamped for use in steam reformers of the other type.

It is known to apply the concept of regenerative reforming in type 1 steam reformers. For this purpose, a specific tube design was made based on Field-tube (also known as a Bayonet tube) reactors. In this design, the catalyst tube consists of an outer tube that is closed at one outer end and further an inner tube (5,15) that is open at both its outer ends, which inner tube (5,15) is received coaxially in the outer tube. This design is for example described in WO 95/11745 and US 2014/0196875. The design relies on the tube in a tube concept where an annular arrangement of the reactor allows for heat exchange between the hot process gas exiting the catalytic bed and the process gas being converted in the upstream part of the catalytic bed.

Although attempts have been made to apply the concept of regenerative reforming in type 2 steam reformers using the above traditional design, success has been limited and has not been widely applied. Also, it has not been possible to revamp existing steam reformers to implement this technology, unless the entire inlet/outlet system is also revamped such that the inlets and outlets are located at the same side (thus effectively revamping the type 2 steam reformer into a type 1 steam reformer—which is a very drastic and complex revamp).

SUMMARY OF THE INVENTION

An object of the invention is therefore to apply the concept of regenerative reforming in type 2 steam reformers. In particular, it is an object of the invention to apply the concept of regenerative reforming into already existing type 2 steam reformers.

A further object of the invention is to provide a catalyst tube in which the catalyst can be easily changed and/or replaced during downtime of the steam reformer.

A further object of the invention is to provide a catalyst tube that has good resistance to differential expansion.

A further object of the invention is to provide a catalyst tube wherein parameters such as temperature and pressure can be measured easily without disturbing the hydrodynamics in the catalytic zone.

At least one these object has been met by providing a catalyst tube for use in a fired heater or industrial furnace (e.g. for use in a reformer, preferably a steam reformer) comprising
- a catalyst tube inlet for process gas to enter the catalyst tube and a catalyst tube outlet for process gas to exit the catalyst tube, which inlet and outlet are located at opposite ends of the catalyst tube;
- an outer reactor tube (1,11);
- an inner tube (5,15) that extends coaxially inside the outer reactor tube (1,11);
- a boundary (3,13) located between the inner wall of the outer reactor tube (1,11) and the outer wall of the inner tube (5,15);
- a first annular channel for catalytically converting process gas, which channel is defined by the inner wall of the outer reactor tube (1,11) and the outer wall of the boundary (3,13), which channel is loaded with catalyst material;
- a second annular channel for process gas to flow countercurrently or co-currently to the process gas flowing through the first annular channel, which second annular channel is defined by the inner wall of the boundary (3,13) and the outer wall of the inner tube (5,15);
- an inlet barrier (4,14) at the inlet end of the catalyst tube for preventing process gas to exit the outer reactor tube (1,11) from the second annular channel and inner tube (5,15) at the inlet end of the catalyst tube;
- an outlet barrier (6,16) at the outlet end of the catalyst tube for preventing process gas to exit the outer reactor tube (1,11) from the first annular channel and from one of the second annular channel and inner tube (5, 15), while allowing process gas to exit the outer reactor tube (1,11) from the other of the second annular channel and inner tube (5,15);
- wherein the inner tube, first annular channel and second annular channel each have an opening at the inlet side of the catalyst tube and an opening at the outlet side of the catalyst tube,
- wherein the catalyst tube inlet is fluidly connected with the opening of the first annular channel at the inlet end of the catalyst tube; the opening of the first annular channel at the outlet end of the catalyst tube is fluidly connected with either the opening of the second annular channel at the outlet end of the catalyst tube or the opening of the inner tube at the outlet end of the catalyst tube; the opening of the second annular channel at the inlet end of the catalyst tube is fluidly connected with the opening of the inner tube (5,15) at the inlet end of the catalyst tube; and either the opening of the inner tube (5,15) at the outlet end of the catalyst tube or the opening of the second annular channel at the outlet end of the catalyst tube is fluidly connected with the catalyst tube outlet.

The inventors found that by providing a new design for the catalyst tubes, it is possible to apply the concept of regenerative reforming into type 2 steam reformers without having to revamp other parts of the steam reformer. Furthermore, the boundary (3,13) provides the internals of the catalyst tube with increased resistance to differential expansion, as this element may be free to expand.

An important aspect of making a new design for a catalyst tube is that a right balance should be struck between the catalyst activity in the catalytic zone (in the first annular channel), the pressure drop in the different channels (which partly determines the velocity of the process gas flow through the channels) and ensuring a proper heat exchange between the channels. The inventors found that the presence of the inner tube (5,15) provides a means to adjust the flow conditions in the second annular channel, such that an efficient heat exchange is obtained between the first and second annular channel.

A further advantage of conducting regenerative reforming using a flow in two annular channels is that such a configuration allows for a high velocity of the process gas through the channels. Such a high velocity may enhance the heat transfer rate and thus the efficiency of the heat-exchange between the gas flows of the first and second annular channel.

The inventors further realized that due to the discovery of improved catalysts over recent years, the required catalyst volume in catalyst tubes no longer poses an insurmountable restriction on catalyst tube design. Accordingly, a first annular channel as defined above was able to provide a sufficiently large catalytic zone for conducting the reforming reaction.

Considering the above, the inventors thus found that a configuration wherein the catalyst tube comprises one inner tube (5,15) (for process gas to exit the catalyst tube and for improving heat exchange) and two annular channels separated by a boundary (3,13) (one for holding the catalyst, the other for providing heat to the catalytic zone) can provide a good combination of catalytic activity, heat exchange and acceptable pressure drop. It was found that this was even the case when having to use the dimensions of catalyst tube inserts of existing steam reformers, thus making it possible to revamp such steam reformers.

Although the invention is illustrated and exemplified herein with respect to reformer reactors and the process of steam reforming, the reactor tube of the invention may also be used in other types of multitubular reactors and catalytic processes. Catalytic processes other than reforming may also benefit from the configuration of the catalytic tubes of the invention, because the specific configuration allows for heat exchange between the hot process gas exiting the catalytic zone of the catalyst tubes and the process gas being converted in the upstream part of the catalytic zone. Thus, process gas exiting the catalytic zone of the catalyst tube can be used as a source of heat for the catalytic reaction. Such a catalytic process is called regenerative catalytic conversion. This is advantageous for any catalytic process that is conducted in a catalyst tube in a fired heater or industrial furnace. Such catalytic process are typically conducted at high temperatures of e.g. at least 400° C. or at least 500° C. Preferably, the fired heater or industrial furnace is a reformer, even more preferably a steam reformer.

DETAILED DESCRIPTION

Figure 1:
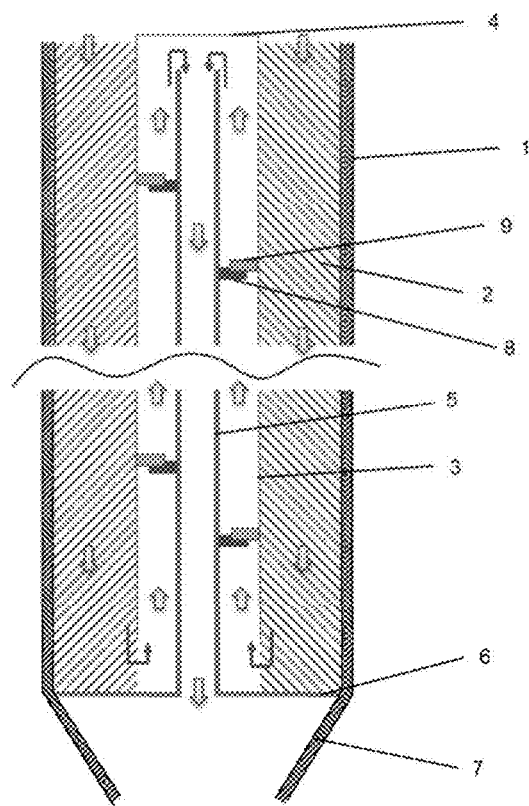
FIG. 1 shows an embodiment of the catalyst tube according to the first base configuration of the invention. The direction in which the process gas flows during operation of the steam reformer is indicated with arrows.
Figure 2:
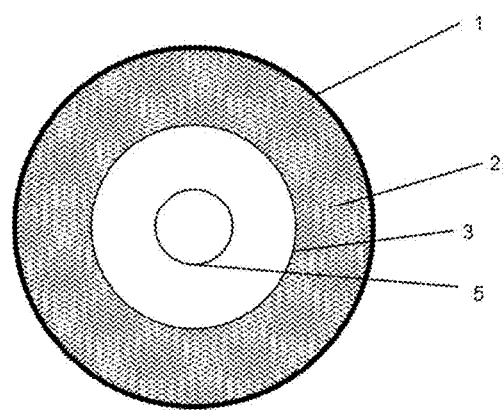
FIG. 2 shows a cross-section of a catalyst tube according to the invention. The cross-section is taken perpendicular to the longitudinal axis of the catalyst tube.
Figure 3:
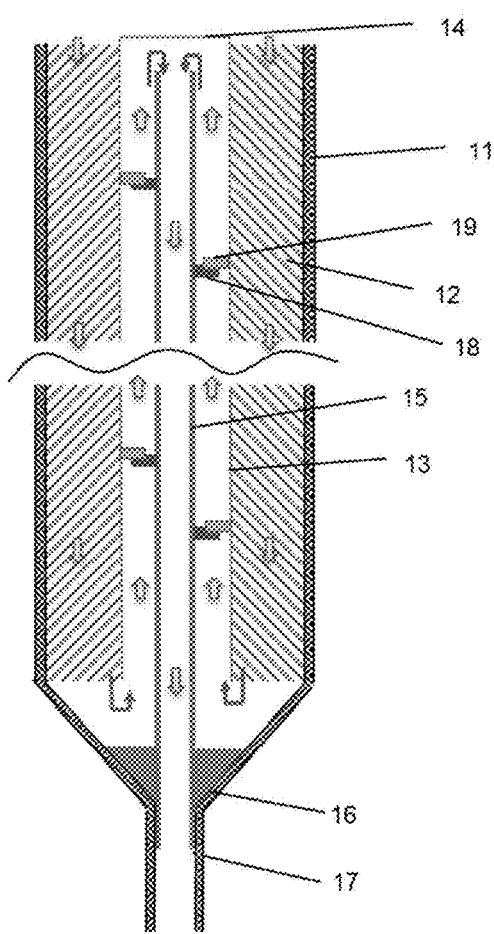
FIG. 3 shows an embodiment of the catalyst tube according to the first base configuration of the invention, wherein the inner tube extends through the outlet barrier. The direction in which the process gas flows during operation of the steam reformer is indicated with arrows.
Figure 4:
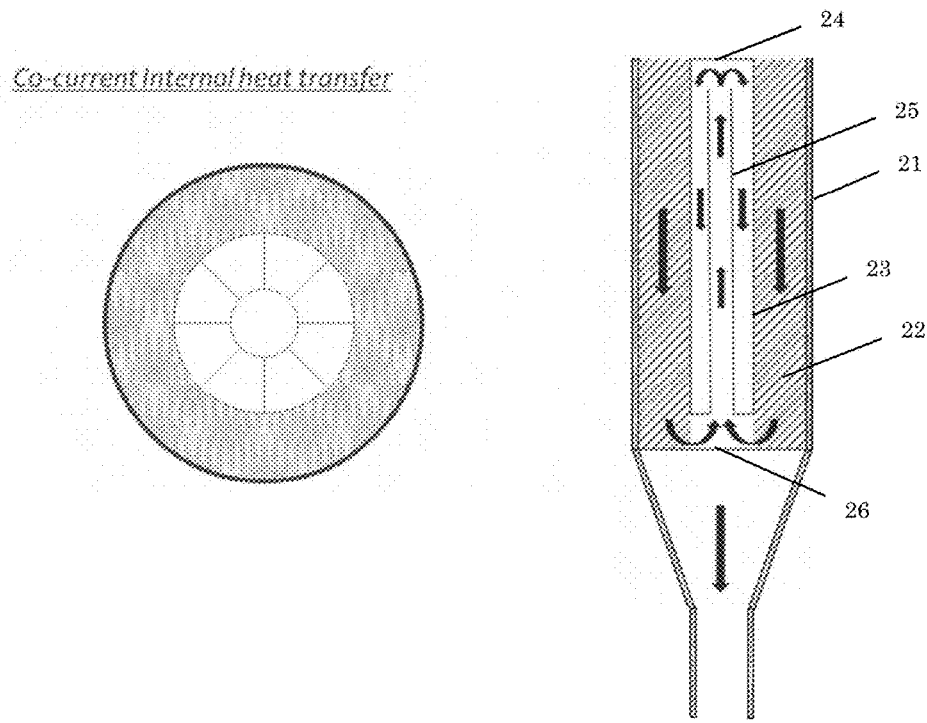
FIG. 4 shows an embodiment of the catalyst tube according to the second base configuration of the invention (right). The direction in which the process gas flows during operation of the steam reformer is indicated with arrows. On the left side of FIG. 4, a possible cross-section of the catalyst tube is provided.
Figure 5:
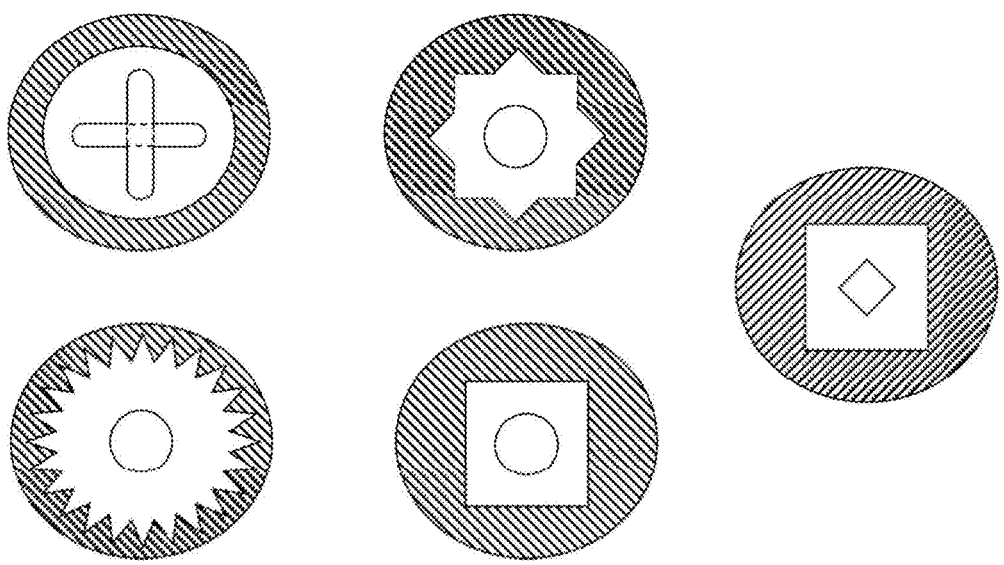
FIG. 5 shows the cross-sections of some possible catalyst tubes according to the invention. The cross-section is taken perpendicular to the longitudinal axis of the catalyst tube.

The term "annular channel" as used herein refers to the outer channel formed by positioning a first tube or tube-like body coaxially inside a second tube or tube-like body. The shape of the channel is thus determined by the shape of the outer wall of the first tube or tube-like body (which is the boundary in case of the first annular channel; and the inner tube in case of the second annular channel) and by the shape of the inner wall of the second tube or tube-like body (which is the catalyst tube in case of the first annular channel and the boundary in case of the second annular channel). In case of two round tubes, the cross-section of the annular channel will have the shape of a circular ring. However, as described below, the cross-section of the inner tube and of the boundary does not need to be circular. Accordingly, the annular channel can have various shapes. These shapes may also vary along the length of the catalyst tube.

For convenience sake, the term "process gas" as used herein may refer to the gas in the reactor in any stage, i.e. both to the gas entering the reactor tube inlet, the gas passing through the first and second annular channel, the gas passing through the inner tube and to the gas leaving the reactor via the tube outlet. More accurately however, the term "feed gas" may be used to refer to the gas entering the reactor tube inlet prior to the catalyst zone, while using the term "process gas" for gas that has been (partially or fully) converted by the catalyst.

The catalyst tube is suitable for regenerative catalytic conversion in general. In particular, the catalyst tube is designed for regenerative steam reforming. In the case of steam reforming, the catalyst tube is a reformer tube.

The configuration described above for the catalyst tube, with the inner tube (5,15) being located inside the outer reactor tube (1,11) with a boundary (3,13) in between the two tubes, provides the catalyst tube of the invention with essentially three channels (viz. the first annular channel, second annular channel and the inner tube (5,15)), with each of the channels having two openings (viz. one at the inlet end of the catalyst tube and one at the outlet end of the catalyst tube).

The inlet and outlet barrier (6,16) provide the three channels in the catalyst tube (i.e. the first and second annular channel and the inner tube) to be connected with each other in the following ways.

The catalyst tube can basically have one of two base configurations. In the first base configuration, the process gas in the first annular channel flows counter-currently to the process gas in the second annular channel, and co-currently with the process gas in the inner tube. In the second base configuration, the process gas in the first annular channel flows counter-currently to the process gas in the inner tube, and co-currently with the process gas in the second annular channel. The first base configuration is preferred, as the efficiency will be highest due to the effective heat exchange between the first and second annular channel. Also, the first base configuration has the advantage that the mechanical design of the catalyst tube is less complex than that of the second base configuration.

In order to establish the above-mentioned direction of flow, the catalyst tube according to the first base configuration has an outlet barrier (6,16) at the outlet end of the catalyst tube for preventing process gas to exit the outer reactor tube (1,11) from the first annular channel and from the second annular channel, while allowing process gas to exit the outer reactor tube (1,11) from the inner tube (5,15). Thus, according to this configuration, the opening of the first annular channel at the outlet end of the catalyst tube is fluidly connected with the opening of the second annular channel at the outlet end of the catalyst tube; and the opening of the inner tube (5,15) at the outlet end of the catalyst tube is fluidly connected with the catalyst tube outlet.

Each channel has two openings, one at the inlet end and one at the outlet end of the catalyst tube. According to the first base configuration, the catalyst tube inlet is fluidly connected with the opening of the first annular channel at the inlet end of the catalyst tube. Thus, process gas entering the catalyst tube will first flow through the first annular channel. The opening of the first annular channel at the outlet end of the catalyst tube is fluidly connected with the opening of the second annular channel at the outlet end of the catalyst tube. Thus, process gas exiting the first annular channel will subsequently enter the second annular channel. The opening of the second annular channel at the inlet end of the catalyst tube is fluidly connected with the opening of the inner tube (5,15) at the inlet end of the catalyst tube. Thus, process gas exiting the second annular channel will subsequently enter the inner tube (5,15). The opening of the inner tube (5,15) at the outlet end of the catalyst tube is fluidly connected with the catalyst tube outlet. Thus, process gas exiting the inner tube (5,15) will subsequently be able to exit the catalyst tube.

Accordingly, when using the catalyst tube according to the first base configuration in a process for catalytic conversion (e.g. steam reforming), the process gas will enter the catalyst tube through its inlet, subsequently flow through the first annular channel to the other (outlet) end of the catalyst tube (thereby being subjected to the catalyst at high temperature), then flow through the second annular channel to the inlet end of the catalyst tube (thereby exchanging heat with the process gas flowing through the first annular channel) and then flow through the inner tube (5,15) to the catalyst tube outlet. Process gas in the second annular channel thus flows in opposite direction of the first annular channel and inner tube (5,15). Thus, co-current heat exchange will occur between the process gas flowing through the first annular channel and the process gas flowing through the second annular channel.

In order to establish the direction of flow mentioned above for the second base configuration, the catalyst tube has an outlet barrier (6,16) at the outlet end of the catalyst tube for preventing process gas to exit the outer reactor tube (1,11) from the first annular channel and from the inner tube (5,15), while allowing process gas to exit the outer reactor tube (1,11) from the second annular channel. Thus, according to this configuration, the opening of the first annular channel at the outlet end of the catalyst tube is fluidly connected with the opening of the inner tube (5,15) at the outlet end of the catalyst tube; and the opening of the second annular channel at the outlet end of the catalyst tube is fluidly connected with the catalyst tube outlet.

According to the second base configuration, the catalyst tube inlet is fluidly connected with the opening of the first annular channel at the inlet end of the catalyst tube. Thus, process gas entering the catalyst tube will first flow through the first annular channel. The opening of the first annular channel at the outlet end of the catalyst tube is fluidly connected with the opening of the inner tube at the outlet end of the catalyst tube. Thus, process gas exiting the first annular channel will subsequently enter the inner tube. The opening of the second annular channel at the inlet end of the catalyst tube is fluidly connected with the opening of the inner tube (5,15) at the inlet end of the catalyst tube. Thus, process gas exiting the inner tube will subsequently enter the inner tube second annular channel. The opening of the second annular channel (5,15) at the outlet end of the catalyst tube is fluidly connected with the catalyst tube outlet. Thus, process gas exiting the second annular channel (5,15) will subsequently be able to exit the catalyst tube.

Accordingly, when using the catalyst tube according to the second base configuration in a process for catalytic conversion (e.g. steam reforming), the process gas will enter the catalyst tube through its inlet, subsequently flow through the first annular channel to the other (outlet) end of the catalyst tube (thereby being subjected to the catalyst at high temperature), then flow through the inner tube to the inlet end of the catalyst tube and then flow through the second annular channel to the catalyst tube outlet (thereby exchanging heat with the process gas flowing through the first annular channel). Process gas in the second annular channel thus flows in the same direction as the first annular channel and inner tube (5,15). Thus, heat exchange will occur between the process gas flowing through the first annular channel and the process gas flowing through the second annular channel. The further design of the catalyst tube is discussed below.

A catalyst tube is an elongated reactor wherein a catalytic reaction (e.g. the reforming reaction) takes place. The catalyst tube comprises a longitudinal axis, which corresponds to the length and longitudinal direction of the catalyst tube, and a lateral axis perpendicular to the longitudinal axis, which corresponds to the width of the catalyst tube. A catalyst tube has two ends, one at both extremities of the longitudinal axis. The catalyst tube generally has an elongated tubular body, which may essentially be made up by the outer reactor tube (1,11). The elongated tubular body typically makes up the largest part of the length of the catalyst tube.

The catalyst tube has a catalyst tube inlet for process gas to enter the catalyst tube. This inlet is for providing process gas to the first annular channel. The catalyst tube further has a catalyst tube outlet for process gas to exit the catalyst tube. The inlet and outlet are located at opposite ends of the catalyst tube. This means that the inlet is located at one end of the catalyst tube (also referred to as the inlet end), while the outlet is located at the other end of the catalyst tube (also referred to as the outlet end). Accordingly, the term "inlet end" as used herein refers to the end of the catalyst tube at which the inlet is located, while the term "outlet end" as used herein refers to the end of the catalyst tube at which the outlet is located. In case of a top fired reformer, the inlet is typically located at the top end of the catalyst tube, while the outlet is located at the bottom end. In case of a bottom fired reformer, the inlet is typically located at the bottom end of the catalyst tube, with the outlet located at the top end. The "end" or "end of a catalyst tube", as used herein, refers to the portion of a catalyst tube at or near its end. As such, it may also be referred to as the "end portion" of the catalyst tube. For example, the end of a catalyst tube may make up 20% or less, typically 10% or less, e.g. 5% or less, of the total length of the catalyst tube. The inlet and/or outlet may thus be located at a side surface of the catalyst tube (in particular, at a side surface of the end portion of the catalyst tube), or on the top or bottom surface of the catalyst tube.

The outer reactor tube (1,11) provides the first annular channel (wherein the catalytic reaction takes place) with its outer wall. At the same time, the outer reactor tube (1,11) may also be the most outer wall of the catalyst tube. The outer reactor tube (1,11) is preferably made of a high thermal conductivity material, such as a metal or metal alloy, e.g. stainless steel. The outer reactor tube (1,11) may have a tapered end at the outlet end of the catalyst tube. Such a shape may provide support for elements present in the catalyst tube, such as the outlet barrier (6,16) or the inner tube (5,15). Alternatively the wall thickness at the bottom of the tube may be increased and/or further machined to provide a support, while keeping the outer diameter constant over the whole tube length.

The inner tube (5,15) extends coaxially inside the outer reactor tube (1,11) and forms a passageway to the catalyst tube outlet. The inner tube (5,15) may extend from the outlet barrier (6,16) (located at the outlet end of the catalyst tube) in longitudinal direction to the inlet end of the catalyst tube. Since process gas exiting the second annular channel should be able to enter the inner tube (5,15), For the same reason, the inner tube (5,15) does preferably not extend in longitudinal direction beyond the boundary (3,13) at the inlet end of the reformer. For the same reason, the inner tube (5,15) does preferably not extend onto or through the inlet barrier (4,14). In such a preferred configuration, no special inlet or outlet is required for the process gas to flow from the second annular channel into the inner tube (5,15). The inner tube (5,15) may be spaced from the boundary (3,13) using for example bearing elements (8,18,9,19) or flow distribution devices or a combination thereof.

The inner tube (5,15) may be made of a ceramic material or metal. The inner tube (5,15) is preferably made of a material having low thermal conductivity, such as a ceramic, metallic or non-metallic material. A material having a low thermal conductivity is defined herein as a material having a thermal conductivity below 10 W/(m·K) at 800° C. and even more preferably below 1 W/(m·K) at 800° C. This can be easily achieved by for example using microporous materials. The inner tube (5,15) may also be an assembly, wherein each part individually can be made of ceramic, metallic or non metallic material. Preferably, the material is also resistant to corrosion by carburization and/or metal dusting. Thus, exchange of heat between the inner tube (5,15) and the process gas flowing through the second annular channel can be limited. Such heat exchange is generally undesirable, because it reduces the amount of heat that can be transferred from the process gas in the second annular channel to the first annular channel. Accordingly, it may desirable to select a material other than metal. Nevertheless, metal can be suitably used, especially a poor conducting metal that is resistant to corrosion, for example by providing the metal with a protective coating (e.g. a ceramic coating).

The inner tube is a hollow elongated body for moving fluids. The inner tube may also be referred to as the inner conduit. In a preferred embodiment, the inner tube is a round tube, which is a tube having a circular cross-section. However, the tube may also be a differently shaped tube, such as a rectangular tube. In this respect, the shape of the tube refers to the cross-section of the tube perpendicular to the longitudinal axis of the tube. The cross-section of the inner tube may be of various shapes, e.g. a square, a rectangle, an oval, an ovoid or a rhombus. The cross-section of the boundary may also be cross shaped, star shaped or circularly shaped with a zigzag edge. Such shapes can be relatively easily obtained by forming the inner tube by extrusion of a ceramic material.

The shape of the inner tube (5,15) is not particularly critical. The inner tube (5,15) may be an essentially straight tube. Alternatively, the inner tube (5,15) may also have a helical shape or swirled shape. A helically shaped tube is for example known from U.S. Pat. No. 6,620,388 and can be suitably applied in the present invention. The inner tube (5,15) may be used to support the boundary (3,13) and optionally the catalyst structure (2,12) attached to the boundary. Thus, the inner tube (5,15) can provide ease of loading of the reactor and help maintain sufficient stability in operation.

In order to fit the inner tube (5,15) in the catalyst tube, the inner tube (5,15) may be mounted on the outlet barrier (6,16). In addition, or alternatively, the inner tube (5,15) may be attached to the boundary (3,13) using for example bearing elements (8,18,9,19) and/or flow distribution devices. The inner tube (5,15) may be spaced from the boundary (3,13) with bearing elements (8,18,9,19) and/or flow distribution devices, preferably such as to ensure sufficient turbulence and thus an improved heat exchange rate between the gas flowing through the first annular channel and the process gas flowing through the second annular channel.

The inner tube (5,15) may be empty. Generally, it is not desirable to include a packing in the inner tube (5,15).

The boundary (3,13) is located between the inner wall of the outer reactor tube (1,11) and the outer wall of the inner tube (5,15). Accordingly, the boundary (3,13) extends coaxially inside the outer reactor tube (1,11), while the inner tube (5,15) extends coaxially inside the boundary (3,13). The boundary (3,13) may extend from the inlet boundary in longitudinal direction to the outlet end of the catalyst tube. Since process gas exiting the first annular channel should be able to enter the second annular channel, the boundary (3,13) does preferably not extend in longitudinal direction beyond the outer reactor tube (1,11) at the outlet end of the reformer. For the same reason, the boundary (3,13) does preferably not extend onto or through the outlet barrier (6,16). In such a preferred configuration, no special inlet or outlet is required for the process gas to flow from the first annular channel into the second annular channel.

The boundary (3,13) forms a boundary between the first annular channel and the second annular channel. The boundary prevents process gas to pass through or penetrate the boundary (3,13). In order to enter the second annular channel, the process gas first needs to pass through the catalytic zone of the first annular channel. Only then may the process gas enter the second annular channel. The boundary (3,13) has two ends (or openings); one open end at the outlet end of the catalyst tube and one closed end at the inlet end of the catalyst tube. The closed end is closed off by the inlet barrier (4,14).

The boundary is in its most simple design a hollow elongated body. The boundary is shaped such as to provide the catalyst tube with a first and a second annular channel. For example, the boundary may be a tubular boundary. In one embodiment, the boundary is in the shape of a round tube, which is a tube having a circular cross-section. However, the cross-section of the boundary may also be of a different shape, e.g. a square, a rectangle or a rhombus. The cross-section of the boundary may also be cross shaped, star shaped or circularly shaped with a zigzag edge. For example, a boundary having the shape of a square tube may be suitably used. The cross-section of the boundary as used herein refers to the cross-section of the boundary perpendicular to the longitudinal axis of the boundary. The boundary may be positioned as a sleeve around the inner tube.

The criteria for selecting the right shape of the inner tube and boundary may be the ratio between the surface of the inner tube and the surface of the boundary. The lower this ratio, the higher proportion of heat is being transferred to the catalytic zone. The heat exchanged with gas flowing through the inner tube should be taken into account in this respect.

The boundary (3,13) may be composed of a single elongated hollow body, such as a hollow cylinder or a tube. However, the boundary (3,13) may also be composed of multiple hollow bodies, e.g. multiple tubular devices, which may be stacked upon each other in the longitudinal direction of the catalyst tube. For example, the boundary (3,13) may comprise a continuous assembly of multiple hollow bodies or tubular devices stacked upon each other, wherein the tubular device may e.g. have a conical, cylindrical or conical frustum shape.

The boundary (3,13) is preferably made of a high thermal conductivity material. This is desirable, as the boundary (3,13) provides the surface over which heat is exchanged between the process gas in the first annular channel and the process gas in the second annular channel. The material may be metal or ceramic.

If a catalyst structure (2,12) is present in the first annular channel, the boundary material may be the same material as the one used for the catalyst structure (2,12). The boundary (3,13) may be spaced from the inner wall of the outer reactor tube (1,11), for example by bearing elements (8,18,9,19) or, more preferably, by a catalyst or catalyst structure (2,12) in the first annular channel.

The first annular channel is defined by the inner wall of the outer reactor tube (1,11) and the outer wall of the boundary (3,13). In the first annular channel, the process gas can flow from the inlet end of the catalyst tube to the outlet end of the catalyst tube. The first annular channel has an opening at either side of the channel. The first opening is for process gas to enter the first annular channel and is located at the inlet end of the catalyst tube. The second opening is for process gas to exit the first annular channel and is located at the outlet end of the catalyst tube. The process gas flowing through the first annular channel is subjected to the catalyst present therein. Therefore, the portion of the first annular channel that is loaded with catalyst may herein also be referred to as the catalytic zone.

The first annular channel comprises the catalyst for the catalytic reaction. The catalyst may be present in the first annular channel in any suitable form. For example, the catalyst may be present in the first annular channel as catalyst pellets or as part of a catalyst structure (2,12) (also known as a structured catalyst). The catalyst promotes the catalytic reaction (e.g. the endothermic steam reforming reaction) which acts as a heat sink to remove a significant fraction of the heat transferred from the furnace. In case the catalyst is a steam reforming catalyst, it is typically a nickel based catalyst and may be provided on a high strength ceramic support.

Preferably, the catalyst is a catalyst with high activity. As the volume of the annular first channel may be relatively small and the expected process gas space velocity relatively high compared to conventional catalytic zones in catalyst tubes, a high activity may compensate for a relatively short residence time of the process gas in the catalytic zone. Furthermore, a suitable catalyst is preferably able to withstand the loading procedure into the catalyst tube, as well as the stresses generated by the process conditions and the thermal cycles endured during the operations. Steam reforming catalysts and catalyst structures (2,12) may generally be designed to have a large geometric surface area and a small pressure drop since the pressure drop allowance across the steam reformer is limited.

Examples of suitable catalysts are catalysts coated on a metallic or ceramic structure or support. The structure or support is not particularly restricted to a specific shape, but is preferably a structure or support that provides for increased turbulence and gas mixing in the channel. For instance, a suitable structure may be a pellet. Suitable pellets are known in the art and are typically cylindrical in shape. Pellets are typically porous. Pellets preferably have a high porosity. Suitable structures are also known in the art, for example cross flow structures. For example, a suitable structure may be a honeycomb monolith, knitted wires, or a foam. The catalyst may be deposited on the structure by different methods including coating techniques, chemical vapour deposition, direct precipitation etc. The higher the surface exposed to the gas phase the better for the catalyst's apparent activity.

The catalyst composition is selected among the known materials active for the catalyst reaction, including but not restricted to metal based catalysts, wherein the metal is selected from nickel, ruthenium, palladium, iridium, platinum, rhodium, boron, osmium, gold and combination thereof. The skilled person will be able to select the specific elemental composition and mass fraction in the catalyst to obtain sufficient activity for the catalytic reaction.

In a preferred embodiment, the first annular channel comprises a catalyst structure (2,12), which structure is at least partially made of corrugated plates, finned elements, a foam type structure and combinations thereof. The catalyst structure (2,12) may be arranged in the reactor tube such that there is sufficient turbulence in the gas phase in order to reduce the amount of process gas passing the catalytic bed unconverted. The structure may provide for an increase in mixing of the process gas in the catalytic zone of the first annular channel. Accordingly, the process gas can be converted sufficiently complete at low pressure drop. The catalyst can be provided upon the structure by any suitable way. The catalyst may for example be provided onto the structure by fixing it to the structure surface (e.g. by coating) or by distributing catalyst particles or pellets throughout the structure. The latter can for example be achieved by pouring the particles or pellets in the first annular tube during downtime of the fired heater.

An advantage of using the above-described catalyst structure (2,12) is that the activity of the catalyst is effectively enhanced by the structure. This is desirable as the process gas generally has a relatively high velocity through the catalytic zone of the first annular channel. This is especially the case in catalyst tubes to be used for revamping existing steam reformers. Since effectively three channels are present in the catalyst tube of the invention, with only one of these three channels comprising catalyst, the volume of the catalytic zone in the catalyst tube of the invention is relatively small. As a result, when a conventional throughput (flowrate) is used, the velocity of the process gas through the first annular channel will be high and there is only limited time for the catalyst to convert the process gas. However, if a catalyst structure (2,12) is present in the first annular channel, this may compensate for the high gas velocity and low contact time. Especially, the combination of a highly active catalyst and a catalyst structure (2,12) may offset the disadvantage of the high velocity of the process gas. An advantage of the relatively high velocity of the process gas and good mixing in the annular channels is that the internal heat transfer coefficient can be improved and the catalytic reaction is thereby enhanced compared to conventional catalyst tubes with packed pellets bed.

A further advantage of using the above-described catalyst structure (2,12) is that it may simplify loading and subtracting the catalyst during downtime. The structure may be designed and fitted such that it can be removed from the catalyst tube. In this case, the boundary (3,13) may be fixed to the catalyst structure (2,12), such that it can be removed as a whole. To provide an easily removable catalyst structure (2,12), the inner tube (5,15) is preferably provided with bearing elements (8,18,9,19) and/or flow distribution devices that support the catalyst structure (2,12). In such a configuration, the catalyst structure (2,12) and boundary (3,13) may for example be simply removed by sliding the boundary (3,13) from the bearing elements (8,18,9,19) of the inner tube (5,15).

The catalytic tube may further comprise a catalyst holder for holding the catalyst in place in the first annular channel. In particular, the catalyst holder is positioned such as to prevent the catalyst from moving towards the outlet end of the catalyst tube. The catalyst holder may for example be attached to the outer reactor tube. The catalyst holder may be positioned at the opening of the first annular channel at the outlet end of the catalyst tube. The catalyst holder may be positioned directly beneath the catalyst or catalyst support. An example of a suitable catalyst holder is a grid structure. The catalyst holder may be made of any suitable material, e.g. metal or ceramic. In a preferred embodiment, the catalyst holder may also function as a support for the inner tube, for the boundary or for both. Accordingly, the inner tube, the boundary or both may be fixed onto the catalyst holder. Since a catalyst holder is typically present in the catalyst tubes of existing reformers and steam reformers (and often fired heaters in general), this makes the inner tube and boundary particularly easy to implement in existing reformers. The inner tube or boundary may also be held by one or more separate holding devices, for example in case a catalyst holder is absent.

At the end of the first annular channel, a passageway may be provided to allow the process gas exiting the first annular channel to flow to the second annular channel. Such a passageway may be naturally present by using the configuration described above.

An additional advantage of the catalyst tube of the present invention is that it provides for the possibility of introducing measurement equipment for measuring parameters (in particular temperature and pressure) inside the reactor without disturbing the hydrodynamics in the catalytic bed. This allows for an improved control of the reactor performances at all time during operation. For instance the pressure difference between the inlet of the reactor, upstream the catalyst, and the second annular channel may be measured and used to control the feed conditions on the catalyst including for instance the steam to carbon ratio, in order to maintain the highest productivity while minimizing carbon formation and risk of runaways. Another option is to control the operation of the furnace based on the readings of the temperature of the gas phase in the second annular channel, for instance directly below the catalyst bed and directly at the end of the said second annular channel just at the location where the gas flows into the inner tube. In that way the performance of the catalyst may be monitored all the time and the amount of energy transferred from the process gas to the reaction zone (from the second annular gap towards the catalytic bed in the first annular space) may be known. As a result, knowing also the cross over temperature or bridgewall temperature of the furnace (temperature at the flue gas extraction location), it is possible to control the firing rate at all time in order to maximize the energy performance of the process at all time in operation. By combining these measurement and control method an online optimization of furnace performance may be adopted.

The second annular channel is defined by the inner wall of the boundary (3,13) and the outer wall of the inner tube (5,15). The second annular channel provides for heat exchange between the gas flowing through it and the process gas flowing through the first annular channel. In the second annular channel, the process gas flows either co-currently or countercurrently to the process gas in the first annular channel, i.e. either from the outlet end of the catalyst tube to the inlet end of the catalyst tube or in the opposite direction. The second annular channel has an opening at both sides of the channel. The first opening is for process gas to enter the second annular channel and in case of the first base configuration is located at the outlet end of the catalyst tube. The second opening is for process gas to exit the second annular channel and in case of the first base configuration is located at the inlet end of the catalyst tube.

As also described above, the second annular channel may comprise bearing elements (8,18,9,19) or flow distribution devices or both. The bearing elements (8,18,9,19) may space apart the boundary (3,13) from the inner tube (5,15), while the flow distribution devices may provide for a desirable flow or turbulence in the channel.

The inlet barrier (4,14) is located at the inlet end of the catalyst tube. The inlet barrier (4,14) is for preventing process gas to exit the outer reactor tube (1,11) from the second annular channel and inner tube (5,15) at the inlet end of the catalyst tube. Consequently, the inlet barrier (4,14) will at the same time prevent process gas to enter the second annular channel and inner tube (5,15) without first having flown through the first annular channel. In particular, the inlet barrier (4,14) prevents process gas to exit or enter the inner part of the boundary (3,13) at the inlet end of the catalyst tube. This can be achieved by closing the opening of the boundary (3,13) that is closest to the inlet end of the catalyst tube off with a barrier. Thus, the inlet barrier (4,14) may be provided by the boundary (3,13) having a closed end at the inlet end of the catalyst tube. The closed end is preferably provided by fixing the inlet barrier (4,14) to the boundary (3,13), for example to the inner walls or to wall top of the boundary (3,13). Fixing can be done by any means, e.g. by welding. The inlet barrier may be a plate made from e.g. metal or ceramic. The inlet barrier (4,14) may be any suitable shape, such as a circular disc. The inlet barrier (4,14) further prevents process gas to escape from the second annular channel towards the inlet of the catalyst tube. The inlet barrier (4,14) may be made of metal or ceramic. The inlet barrier may form a continuous body with the structured catalyst. The inlet barrier (4,14) may be made of the same or different material as the inner reactor tube, for example ceramic or metal coated with ceramic or an alloy resistant to corrosion by carburization.

The inlet barrier (4,14) is generally supported in the catalyst tube by being attached to the boundary (3,13). If a header is present (see below), the inlet barrier (4,14) may also be attached to the header.

The outlet barrier (6,16) is located at the outlet end of the catalyst tube. In case of the first base configuration, the outlet barrier (6,16) is for preventing process gas to exit the outer reactor tube from the first and second annular channel, while allowing process gas to exit the outer reactor tube (1,11) from the inner tube (5,15). Without such an outlet barrier (6,16), process gas exiting the first annular channel would exit the outer reactor tube (1,11). The outlet barrier (6,16) ensures that the process gas is instead fed to the second annular channel, such that process first has to flow through the second annular channel and the inner tube (5,15) before exiting the outer reactor tube (1,11). The outlet barrier (6,16) typically comprises a gap for allowing process gas to exit the inner tube (5,15). In case of the second base configuration, the outlet barrier is for preventing process gas to exit the outer reactor tube from the first annular channel and inner tube, while allowing process gas to exit the outer reactor tube (1,11) from the second annular channel.

The outlet barrier (6,16) may be connected or fixed to the outer reactor tube (1,11) or the inner tube (5,15) or both. For example, the outlet barrier (6,16) may be fixed by any means to the inner wall of the outer reactor tube (1,11) or to the outer wall of the inner tube (5,15), e.g. by welding. In case the outer tube has a tapered end (7,17), the outlet barrier (6,16) may also be held on the tapered transition of the outer reactor tube (1,11).

The outlet barrier (6,16) may also provide support to the inner tube (5,15). For example, the inner tube (5,15) may be mounted on the surface of the outlet barrier (6,16) (i.e. on the surface facing the inlet end of the catalyst tube). The inner tube (5,15) may also extend into or even extend through the barrier. The inner tube (5,15) can also be extended into an outlet pipe (17) of the catalyst tube or into an outlet assembly, or outlet pigtail that may be present below the catalyst tube.

In case of the first base configuration, the outlet barrier (6,16) may comprise a circular surface comprising a gap at its center. The gap provides an opening for process gas to exit the inner tube (5,15). The circular shape is suitable for closing off the first and second annular channel. The circular surface may be connected at its sides to the inner wall of the outer reactor tube (1,11). The circular surface may be part of the surface of a cone shaped body, a cylinder shaped body or a conical frustum shaped body. Such shaped bodies may provide suitable shapes for the outlet barrier (6,16). For example, the outlet barrier (6,16) may be circular disc with a hole in the middle.

The catalyst tube may further comprises a header, wherein process gas can be transported from the inlet to the first annular channel. The header may also act as a cover or lid for the outer reactor tube (1,11) at the inlet end of the catalyst tube. The header can be attached to the inlet end of the outer reactor tube (1,11), e.g. by mechanical means such as screws or bolts. The header may also provide further support to the different elements in the catalyst tube, such as the boundary (3,13) and the inlet barrier (4,14).

The catalyst tube can be mounted in the radiant section of an industrial furnace or fired heater, e.g. of a steam reformer. The catalyst tube according to the invention is preferably suitable for insertion into the furnace chamber of an industrial furnace or fired heater (e.g. a steam reformer). The catalyst tube can then be inserted into the furnace chamber and fixed with its one end to one furnace chamber wall and with its other end to the opposite furnace chamber wall. Preferably, the catalyst tube is removably attached in the industrial furnace or fired heater. The catalyst tube can thus be easily removed from the furnace chamber during downtime. This makes it easier to provide fresh catalyst material in the catalyst tubes if necessary.

Suitable dimensions for the inner tube (5,15), the boundary (3,13) and the outer reactor tube (1,11) may be selected as follows.

Unless noted otherwise, the term "diameter" as used herein refers to the inner diameter of the tube, pipe or boundary. This means that the thickness of the wall of the tube, pipe or boundary is excluded from the diameter.

The diameter of the outer reactor tube (1,11) is not particularly critical. Nevertheless, in case the catalyst tube is to be used in an existing steam reformer (i.e. revamping), the diameter of the outer reactor tube (1,11) may be predetermined and often relatively small. Generally, the diameter of the outer reactor tube lies in the range of 5 to 25 cm. When referring to the diameter of the outer reactor tube herein, the thickness of the outer reactor tube wall is excluded from the diameter.

The size of the diameter of the boundary (3,13) is for an important part determined by the minimum volume required for the first annular channel, by the required space velocity and by the pressure drop implied by the catalyst.

With respect to the volume of the first annular channel, the catalytic zone needs to have a sufficiently large volume to be able to convert the process gas sufficiently complete. Accordingly, unless a catalyst with an exceptionally high activity is used, the diameter of the boundary (3,13) should not be too large relative to the diameter of the outer reactor tube. The maximum value of the boundary is highly dependent on parameters such as the diameter of the outer reactor tube and the flowrate to be used. The diameter of the boundary (3,13) may often be less than 90% of the diameter of the outer reactor tube, for example in case of a conventional outer tube with a diameter of 10 cm operated at moderate flow rate. Nevertheless, at high throughput and/or outer reactor tubes with a large diameter, this percentage can be higher.

The volume of the catalytic zone in the first annular channel should not be too large, because it would result in a significant reduction in the area available for the heat transfer and an excessive increase in the pressure drop in the second annular gap and the inner tube. Therefore, the diameter of the boundary (3,13) may generally be at least 50% of the size of the diameter of the outer reactor tube (excluding the thickness of the outer reactor tube wall).

The diameter of the boundary (3,13) may generally be 50-95%, for example 58-90% of the size of the diameter of the outer reactor tube (excluding the thickness of the outer reactor tube wall).

The size of the diameter of the inner tube may be adjusted such as to obtain a high velocity of the process gas in the second annular gap. Such a high velocity may promote heat transfer from the hot process gas in the second annular channel to the process gas in the catalytic zone of the first annular channel. Accordingly, the diameter of the inner tube is selected such that the difference between the diameter of the boundary and the diameter of the inner tube is in the range of 10 to 50%, preferably 15 to 40% of the size of the diameter of the outer reactor tube (excluding the thickness of the outer reactor tube wall).

The diameter of the inner tube (5,15) may be in the range of 1.0 to 4.0 cm, preferably 2.0 to 3.0 cm. The diameter is preferably set to a size equal or smaller than the diameter of the outlet pipe of the catalyst tube (17), that is typically about 2.5 cm. Such diameters are sufficiently large in order to limit the pressure drop inside the inner tube.

In a second aspect, the invention is directed to a multitubular reactor comprising a furnace chamber and at least one catalyst tube according to the invention. The multitubular reactor may comprise multiple catalyst tubes which are parallel to each other. The furnace chamber may for example comprise one or more rows of catalyst tubes. For example, a typical top-fired multitubular reactor has process gas flowing downwards through multiple rows of tubes, all of which are contained within the furnace chamber. The burners are located on the furnace top in rows between each tube row and flue gas is extracted at the bottom of the furnace. For a bottom-fired steam multitubular reactor, a similar configuration can be used with the burners at the bottom and the process flowing upwards.

The multitubular reactor may comprise a furnace chamber wherein the burners directly heat the catalyst tubes. For example the multitubular reactor may be a top, bottom or side fired reactor. The catalyst tube inlets and catalyst tube outlets of the at least one catalyst tube are located at opposite sides of the furnace chamber.

Alternatively, the catalyst tubes can also be heated indirectly by the burners, e.g. via a heat medium such as heated steam. An indirect multitubular reactor comprises an external combustion chamber. In this case, the furnace chamber may have one compartment comprising the burners (which is called the external combustion chamber) and a separate compartment comprising the catalyst tubes.

In a preferred embodiment, the multitubular reactor is a steam reformer. In principle however, the reactor of the invention is suitable to accommodate any catalytic conversion in which heat transfer plays an important role in the production of the converted product, e.g. reactors for the catalytic conversion to ammonia, catalytic conversion to methanol, water-gas shift converters, Fischer Tropsch catalytic converters etc.

In a third aspect, the invention is directed to a method for conducting a catalytic reaction in a catalyst tube according to the invention. The flow of the process gas in such a method has already been described above. The method thus comprises heat exchange between gas flowing through the first annular channel and gas flowing through the second annular channel.

The catalytic reaction is in particular a catalytic conversion reaction. In principle, any catalytic conversion in which heat transfer plays an important role in the production of the converted product may be suitably conducted in the catalyst tube of the invention. An example of such reactions are steam reforming, the catalytic conversion to ammonia. In a preferred embodiment, the method is for conducting regenerative steam reforming.

In a fourth aspect, the invention is directed to the use of catalyst tube according to the invention for revamping an existing type 2 steam reformer, i.e. a steam reformer wherein the catalyst tube inlets and outlets are located at opposite sides of the furnace chamber. In such a steam reformer, the catalyst tube according to the invention can replace the existing catalyst tubes, which makes it possible to conduct regenerative reforming in the steam reformer.

In a preferred embodiment, revamping of a steam reformer is done by using the existing catalyst holder in the reformer tubes of the existing steam reformer. This has the advantage that it is not necessary to displace the existing catalyst holder, which would involve extensive welding work on site. The role of the catalyst holder in conventional reformer tubes in existing reformers is to hold the catalyst in place. Accordingly, the inner tube and/or boundary are positioned in the existing reformer tubes by using the existing catalyst holder as a support.

According to this aspect of the invention, the catalyst tube according to the invention may also be used for revamping an existing industrial furnace or fired heater in general, e.g. by replacing an existing catalyst tube with a catalyst tube according to the invention and/or using the existing catalyst holder if possible.

The invention claimed is:

1. A catalyst tube for regenerative catalytic conversion of process gas in an industrial furnace comprising
    a catalyst tube inlet for process gas to enter the catalyst tube and a catalyst tube outlet for process gas to exit the catalyst tube, which inlet and outlet are located at opposite ends of the catalyst tube;
    an outer reactor tube;
    an inner tube that extends coaxially inside the outer reactor tube;
    a boundary located between the inner wall of the outer reactor tube and the outer wall of the inner tube;
    a first annular channel for catalytically converting process gas, which channel is defined by the inner wall of the outer reactor tube and the outer wall of the boundary, which channel is loaded with catalyst material;
    a second annular channel for process gas to flow countercurrently or co-currently to the process gas flowing through the first annular channel, which second annular channel is defined by the inner wall of the boundary and the outer wall of the inner tube;
    an inlet barrier at the inlet end of the catalyst tube for preventing process gas to exit the outer reactor tube from the second annular channel and inner tube at the inlet end of the catalyst tube;
    an outlet barrier at the outlet end of the catalyst tube for preventing process gas to exit the outer reactor tube from the first annular channel and from one of the second annular channel and the inner tube, while allowing process gas to exit the outer reactor tube from the other of the second annular channel and the inner tube;
    wherein the inner tube, first annular channel and second annular channel each have an opening at the inlet side of the catalyst tube and an opening at the outlet side of the catalyst tube,
    wherein the catalyst tube inlet is fluidly connected with the opening of the first annular channel at the inlet end of the catalyst tube; the opening of the first annular channel at the outlet end of the catalyst tube is fluidly connected with either the opening of the second annular channel at the outlet end of the catalyst tube or the opening of the inner tube at the outlet end of the catalyst tube; the opening of the second annular channel at the inlet end of the catalyst tube is fluidly connected with the opening of the inner tube at the inlet end of the catalyst tube; and either the opening of the inner tube at the outlet end of the catalyst tube or the opening of the second annular channel at the outlet end of the catalyst tube is fluidly connected with the catalyst tube outlet.

2. A catalyst tube according to claim 1, wherein
    the outlet barrier is an outlet barrier at the outlet end of the catalyst tube for preventing process gas to exit the outer reactor tube from the first annular channel and second annular channel, while allowing process gas to exit the outer reactor tube from the inner tube; and
    wherein the catalyst tube inlet is fluidly connected with the opening of the first annular channel at the inlet end of the catalyst tube; the opening of the first annular channel at the outlet end of the catalyst tube is fluidly connected with the opening of the second annular channel at the outlet end of the catalyst tube; the opening of the second annular channel at the inlet end of the catalyst tube is fluidly connected with the opening of the inner tube at the inlet end of the catalyst tube; and the opening of the inner tube at the outlet end of the catalyst tube is fluidly connected with the catalyst tube outlet.

3. A catalyst tube according to claim 1, wherein
    the outlet barrier is an outlet barrier at the outlet end of the catalyst tube for preventing process gas to exit the outer reactor tube from the first annular channel and the inner tube, while allowing process gas to exit the outer reactor tube from the second annular channel; and
    wherein the catalyst tube inlet is fluidly connected with the opening of the first annular channel at the inlet end of the catalyst tube; the opening of the first annular channel at the outlet end of the catalyst tube is fluidly connected with the opening of the inner tube at the outlet end of the catalyst tube; the opening of the second annular channel at the inlet end of the catalyst tube is fluidly connected with the opening of the inner tube at the inlet end of the catalyst tube; and
    the opening of the second annular channel at the outlet end of the catalyst tube is fluidly connected with the catalyst tube outlet.

4. A catalyst tube according to claim 1, wherein the outlet barrier comprises a circular surface connected at its sides to the inner wall of the outer reactor tube, wherein the circular surface comprises a gap at its center for allowing process gas to exit the inner tube.

5. A catalyst tube according to claim 1, wherein the outlet barrier comprises a cone shaped body, a cylinder shaped body or a conical frustum shaped body.

6. A catalyst tube according to claim 1, wherein the inner tube is mounted on the surface of the outlet barrier or wherein the inner tube extends through the outlet barrier.

7. A catalyst tube according to claim 1, wherein the outer reactor tube has a tapered end at the outlet end of the reactor.

8. A catalyst tube according to claim 1, wherein the boundary has an open end at the outlet end of the catalyst tube and a closed end at the inlet end of the catalyst tube, wherein the closed end is closed off by the inlet barrier, wherein the inlet barrier is preferably fixed or welded to the boundary at the inlet end of the reactor.

9. A catalyst tube according to claim 1, wherein the first annular channel comprises a structure comprising one or more of corrugated plates, finned elements and foam, upon which structure the catalyst is provided.

10. A catalyst tube according to claim 1, wherein the boundary is made of a high thermal conductivity material.

11. A catalyst tube according to claim 1, wherein the boundary comprises a continuous assembly of multiple tubular devices stacked upon each other.

12. A catalyst tube according to claim 1, wherein the inner reactor tube is made of a low thermal conductivity material having a thermal conductivity below 10 W/(m·K) at 800° C.

13. A catalyst tube according to claim 1, wherein the inner tube is a round tube, a square tube or a rectangular tube.

14. A multitubular reactor comprising a furnace chamber and at least one catalyst tube according to claim 1, wherein the catalyst tube inlets and catalyst tube outlets of the at least one catalyst tube are located at opposite sides of the furnace chamber.

15. A multitubular reactor according to claim 14, wherein the furnace chamber comprises multiple rows of catalyst tubes contained within the furnace chamber and wherein burners are located in rows between each tube row.

16. A multitubular reactor according to claim 14, wherein the reactor is a steam reformer.

17. A method for conducting a catalytic conversion reaction in a catalyst tube according to claim 1.

18. Use of catalyst tube according to claim 1 for revamping a reformer, wherein the reformer comprises a furnace chamber and at least one catalyst tube, wherein the catalyst tube inlets and catalyst tube outlets of the at least one catalyst tube are located at opposite sides of the furnace chamber.

19. Use according to claim 18, wherein revamping is done by attaching the inner tube, boundary or both to the existing catalyst holder in the reformer tubes of the existing reformer.

20. A catalyst tube according to claim 1, wherein the boundary comprises a continuous assembly of multiple tubular devices stacked upon each other, wherein the tubular device includes at least one of a conical, cylindrical or conical frustum shape.

21. A method for conducting a catalytic conversion reaction in a reactor according to claim 14.

* * * * *